United States Patent
Lin

(10) Patent No.: US 12,189,230 B2
(45) Date of Patent: Jan. 7, 2025

(54) DISPLAY PANEL AND DISPLAY DEVICE

(71) Applicant: Guangzhou China Star Optoelectronics Semiconductor Display Technology Co., LTd., Guangdong (CN)

(72) Inventor: Yunpeng Lin, Guangdong (CN)

(73) Assignee: Guangzhou China Star Optoelectronics Semiconductor Display Technology Co., LTD., Guangzhou (CN)

( * ) Notice: Subject to any disclaimer, the term of this patent is extended or adjusted under 35 U.S.C. 154(b) by 0 days.

(21) Appl. No.: 18/509,332

(22) Filed: Nov. 15, 2023

(65) Prior Publication Data

US 2024/0385476 A1   Nov. 21, 2024

(30) Foreign Application Priority Data

May 15, 2023   (CN) .......................... 202310546163.9

(51) Int. Cl.
  *G02F 1/1335*   (2006.01)
  *G02F 1/1333*   (2006.01)
  *G02F 1/1362*   (2006.01)

(52) U.S. Cl.
  CPC .. *G02F 1/133512* (2013.01); *G02F 1/133357* (2021.01); *G02F 1/133514* (2013.01); *G02F 1/133526* (2013.01); *G02F 1/133553* (2013.01); *G02F 1/136222* (2021.01); *G02F 2201/50* (2013.01); *G02F 2202/30* (2013.01); *G02F 2203/01* (2013.01); *G02F 2203/02* (2013.01)

(58) Field of Classification Search
  CPC ......... G02F 1/133512; G02F 1/136209; G02F 1/133526; G02F 2202/30; G02F 1/136222; G02F 1/133553
  See application file for complete search history.

(56) References Cited

U.S. PATENT DOCUMENTS

2002/0113927 A1 * 8/2002 Ha .................... G02F 1/1362
                                                                         349/113
2020/0271984 A1 * 8/2020 Kudo ................ G02F 1/133512

FOREIGN PATENT DOCUMENTS

CN   112771442 A   *   5/2021   ......... G02F 1/13347
CN   114185212 A   *   3/2022   ............ G02F 1/1362
KR   20070122023 A  * 12/2007   ............ G02F 1/1362

* cited by examiner

*Primary Examiner* — Jessica M Merlin
(74) *Attorney, Agent, or Firm* — PV IP PC; Wei Te Chung

(57) ABSTRACT

A display panel and a display device. The display panel includes a first substrate, a second substrate, and a liquid crystal layer disposed between the first substrate and the second substrate. The first substrate includes a driving circuit layer. The driving circuit layer includes a light-shielding portion and a plurality of light-transmitting portions. The second substrate includes a light-shielding layer. The light-shielding layer includes a body portion and a plurality of hollow portions. The body portion is disposed corresponding to the light-shielding portion. The hollow portions are disposed corresponding to the light-transmitting portions. The first substrate further includes a refractive layer disposed on a side of the light-shielding portion away from the liquid crystal layer, or the second substrate further includes a refractive layer disposed on a side of the body portion away from the liquid crystal layer.

20 Claims, 1 Drawing Sheet

DISPLAY PANEL AND DISPLAY DEVICE

CROSS REFERENCE TO RELATED APPLICATION

This application claims the priority of Chinese Patent Application No. 202310546163.9, entitled "DISPLAY PANEL AND DISPLAY DEVICE", filed on May 15, 2023, the disclosure of which is incorporated herein by reference in its entirety.

FIELD OF DISCLOSURE

The present disclosure relates to a field of display technology, specifically relates to a display panel and a display device.

BACKGROUND

With development of display technology, flat display devices such as liquid crystal displays (LCDs) are widely used in various consumer electronics such as mobile phones, televisions, personal digital assistants, digital cameras, notebook computers, desktop computers, and other consumer electronic products due to their advantages of high image quality, power saving, thin body, and wide applications, and have become a mainstream of display devices.

Liquid crystal display panels are divided into transmissive liquid crystal display panels and reflective liquid crystal display panels, wherein transmissive liquid crystal display panels use backlights as display light sources, and reflective liquid crystal display panels use external ambient light as display light sources.

Whether it is a transmissive liquid crystal display panel or a reflective liquid crystal display panel, it requires an opaque structure. The opaque structure is, for example, a black matrix to prevent light leakage and light mixing, or various metal traces and thin film transistors in a driving circuit layer. A part of a light irradiated from a light source onto the display panel will be absorbed or blocked by the opaque structure, so that it cannot enter the display panel and is emitted from a display side of the display panel, causing defects such as low power efficiency and low display brightness of the display panel. This problem needs to be solved.

SUMMARY

The present disclosure provides a display panel and a display device, which can effectively solve problems of low power efficiency and low display brightness of current display panels.

In a first aspect, the present disclosure provides a display panel. The display panel comprises: a first substrate, a second substrate, and a liquid crystal layer disposed between the first substrate and the second substrate. The first substrate comprises a driving circuit layer. The driving circuit layer comprises a light-shielding portion and a plurality of light-transmitting portions. The second substrate comprises a light-shielding layer. The light-shielding layer comprises a body portion and a plurality of hollow portions. The body portion is disposed corresponding to the light-shielding portion. The hollow portions are disposed corresponding to the light-transmitting portions. The first substrate further comprises a refractive layer disposed on a side of the light-shielding portion away from the liquid crystal layer, or the second substrate further comprises a refractive layer disposed on a side of the body portion away from the liquid crystal layer.

Optionally, the refractive layer comprises a plurality of optical lenses with metasurfaces.

Optionally, the optical lenses are titanium oxide nanopillars, and at least two of the titanium oxide nanopillars have different heights.

Optionally, the display panel is a reflective display panel. A side of the second substrate away from the liquid crystal layer is a display side of the display panel. The second substrate further comprises the refractive layer disposed on a side of the light-shielding layer away from the liquid crystal layer. The first substrate further comprises a reflective layer disposed on a side of the driving circuit layer facing the liquid crystal layer. A vertical projection of the reflective layer on the driving circuit layer covers at least the light-which is located on a side of the first surface facing the liquid crystal layer. The second surface is a reflective surface of the reflective layer.

Optionally, the first substrate further comprises a color filter layer and a pixel electrode layer. The color filter layer is disposed on a side of the reflective layer facing the liquid crystal layer. The pixel electrode layer includes a plurality of pixel electrodes, wherein the pixel electrodes are disposed corresponding to the light-transmitting portions, and the pixel electrodes are disposed on a side of the color filter layer facing the liquid crystal layer.

Optionally, the first substrate further comprises an anti-oxidation protective layer disposed on a side of the pixel electrode layer facing the second substrate. The anti-oxidation protective layer includes a plurality of anti-oxidation protective units. The anti-oxidation protective units are disposed corresponding to the pixel electrodes.

Optionally, the second substrate further comprises a second substrate layer, a planarization layer disposed on a side of the second substrate layer facing the liquid crystal layer, a base layer disposed on a side of the planarization layer facing the liquid crystal layer, and a common electrode layer disposed on a side of the light-shielding layer facing the liquid crystal layer. A material of the base layer is a silicon-based material. The refractive layer is disposed on a surface of the base layer facing the liquid crystal layer. The light-shielding layer is disposed on a side of the refractive layer facing the first substrate. A vertical projection of the common electrode layer on the second substrate covers a vertical projection of the light-shielding layer on the second substrate.

Optionally, the display panel is a transmissive display panel. A side of the second substrate away from the liquid crystal layer is a display side of the display panel. The display panel further comprises a backlight disposed on a side of the first substrate away from the liquid crystal layer. The first substrate further comprises the refractive layer disposed on a side of the driving circuit layer away from the liquid crystal layer.

Optionally, the first substrate further comprises a first substrate layer. A material of the first substrate layer is a silicon-based material. The refractive layer is disposed on a surface of the first substrate layer facing the liquid crystal layer.

In a second aspect, the present disclosure provides a display device. The display device comprises a housing and a display panel. The housing has an accommodating space, and the display panel is disposed in the accommodating space. The display panel comprises a first substrate, a second substrate, and a liquid crystal layer disposed between the first substrate and the second substrate. The first substrate comprises a driving circuit layer. The driving circuit layer comprises a light-shielding portion and a plurality of light-transmitting portions. The second substrate comprises a light-shielding layer. The light-shielding layer comprises a body portion and a plurality of hollow portions. The body portion is disposed corresponding to the light-shielding portion. The hollow portions are disposed corresponding to the light-transmitting portions. The first substrate further comprises a refractive layer disposed on a side of the light-shielding portion away from the liquid crystal layer, or the second substrate further comprises a refractive layer disposed on a side of the body portion away from the liquid crystal layer.

Optionally, the refractive layer comprises a plurality of optical lenses with metasurfaces.

Optionally, the optical lenses are titanium oxide nanopillars, and at least two of the titanium oxide nanopillars have different heights.

Optionally, the display panel is a reflective display panel. A side of the second substrate away from the liquid crystal layer is a display side of the display panel. The second substrate further comprises the refractive layer disposed on a side of the light-shielding layer away from the liquid crystal layer. The first substrate further comprises a reflective layer disposed on a side of the driving circuit layer facing the liquid crystal layer. A vertical projection of the reflective layer on the driving circuit layer covers at least the light-which is located on a side of the first surface facing the liquid crystal layer. The second surface is a reflective surface of the reflective layer.

Optionally, the first substrate further comprises a color filter layer and a pixel electrode layer. The color filter layer is disposed on a side of the reflective layer facing the liquid crystal layer. The pixel electrode layer includes a plurality of pixel electrodes, wherein the pixel electrodes are disposed corresponding to the light-transmitting portions, and the pixel electrodes are disposed on a side of the color filter layer facing the liquid crystal layer.

Optionally, the first substrate further comprises an anti-oxidation protective layer disposed on a side of the pixel electrode layer facing the second substrate. The anti-oxidation protective layer includes a plurality of anti-oxidation protective units. The anti-oxidation protective units are disposed corresponding to the pixel electrodes.

Optionally, the second substrate further comprises a second substrate layer, a planarization layer disposed on a side of the second substrate layer facing the liquid crystal layer, a base layer disposed on a side of the planarization layer facing the liquid crystal layer, and a common electrode layer disposed on a side of the light-shielding layer facing the liquid crystal layer. A material of the base layer is a silicon-based material. The refractive layer is disposed on a surface of the base layer facing the liquid crystal layer. The light-shielding layer is disposed on a side of the refractive layer facing the first substrate. A vertical projection of the common electrode layer on the second substrate covers a vertical projection of the light-shielding layer on the second substrate.

Optionally, the display panel is a transmissive display panel. A side of the second substrate away from the liquid crystal layer is a display side of the display panel. The display panel further comprises a backlight disposed on a side of the first substrate away from the liquid crystal layer. The first substrate further comprises the refractive layer disposed on a side of the driving circuit layer away from the liquid crystal layer.

Optionally, the first substrate further comprises a first substrate layer. A material of the first substrate layer is a silicon-based material. The refractive layer is disposed on a surface of the first substrate layer facing the liquid crystal layer.

The present disclosure provides a display panel and a display device. The display panel comprises a first substrate, a second substrate, and a liquid crystal layer disposed between the first substrate and the second substrate. The first substrate comprises a driving circuit layer. The driving circuit layer comprises a light-shielding portion and a plurality of light-transmitting portions. The second substrate comprises a light-shielding layer. The light-shielding layer comprises a body portion and a plurality of hollow portions. The body portion is disposed corresponding to the light-shielding portion. The hollow portions are disposed corresponding to the light-transmitting portions. The first substrate further comprises a refractive layer disposed on a side of the light-shielding portion away from the liquid crystal layer, or the second substrate further comprises a refractive layer disposed on a side of the body portion away from the liquid crystal layer. A refractive layer of the display panel can change an emission direction of a light, so that a light emitted by a light source that should originally irradiate to a light-shielding portion or a body portion enters the display panel after being refracted by the refractive layer, thereby increasing a maximum brightness of the display panel under limited ambient illumination.

BRIEF DESCRIPTION OF DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

DETAILED DESCRIPTION OF PREFERRED EMBODIMENTS

Figure 1:
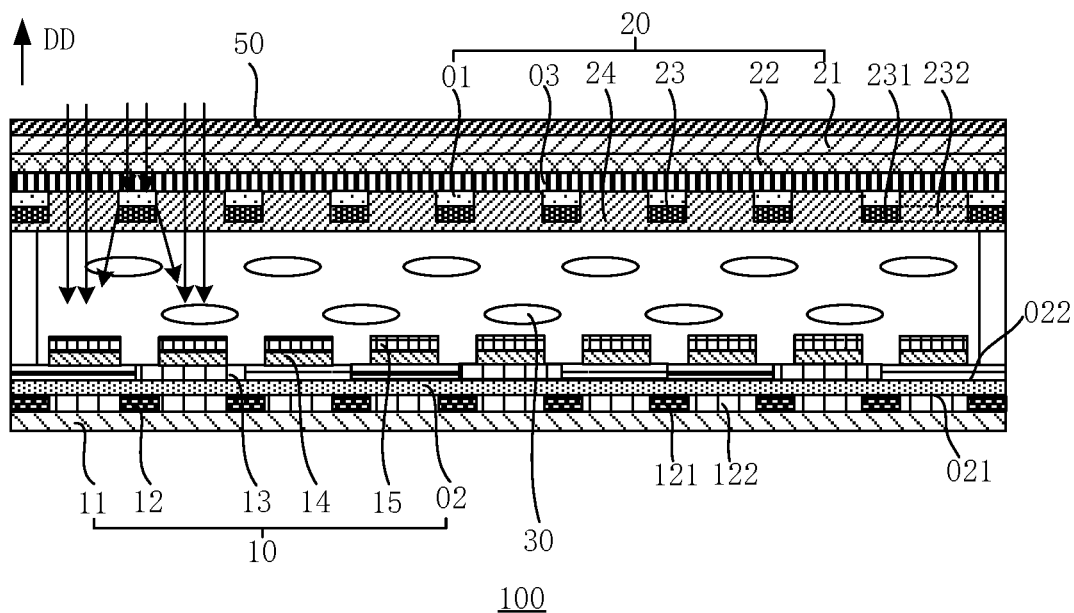
FIG. 1 is a schematic diagram of a display panel according to an embodiment of the present disclosure.

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The following disclosure provides many different embodiments or examples to implement different structures of the present disclosure. In order to simplify the disclosure of the present disclosure, the components and settings of specific examples are described below. They are for example purposes only and are not intended to limit this application. Further, the present disclosure may repeat reference numbers and/or reference letters in different examples, such duplication is for the purpose of simplification and clarity, and does not by itself indicate the relationship between the various embodiments and/or settings discussed. Further, the present disclosure provides various examples of specific processes and materials, but those of ordinary skill in the art may be aware of the application of other processes and/or the use of other materials. The following are described in detail, it should be noted that the order of description of the following embodiments is not used as a qualification for the preferred order of embodiments.

the present disclosure provides a display panel and a display device. The display panel comprises a first substrate, a second substrate, and a liquid crystal layer disposed between the first substrate and the second substrate. The first substrate comprises a driving circuit layer. The driving circuit layer comprises a light-shielding portion and a plurality of light-transmitting portions. The second substrate comprises a light-shielding layer. The light-shielding layer comprises a body portion and a plurality of hollow portions. The body portion is disposed corresponding to the light-shielding portion. The hollow portions are disposed corresponding to the light-transmitting portions. The first substrate further comprises a refractive layer disposed on a side of the light-shielding portion away from the liquid crystal layer, or the second substrate further comprises a refractive layer disposed on a side of the body portion away from the liquid crystal layer. The display device comprises a housing and a display panel. The housing has an accommodating space, and the display panel is disposed in the accommodating space.

The present disclosure provides a display panel and a display device. The display panel comprises a first substrate, a second substrate, and a liquid crystal layer disposed between the first substrate and the second substrate. The first substrate comprises a driving circuit layer. The driving circuit layer comprises a light-shielding portion and a plurality of light-transmitting portions. The second substrate comprises a light-shielding layer. The light-shielding layer comprises a body portion and a plurality of hollow portions. The body portion is disposed corresponding to the light-shielding portion. The hollow portions are disposed corresponding to the light-transmitting portions. The first substrate further comprises a refractive layer disposed on a side of the light-shielding portion away from the liquid crystal layer, or the second substrate further comprises a refractive layer disposed on a side of the body portion away from the liquid crystal layer. A refractive layer of the display panel can change an emission direction of a light, so that a light emitted by a light source that should originally irradiate to a light-shielding portion or a body portion enters the display panel after being refracted by the refractive layer, thereby increasing a maximum brightness of the display panel under limited ambient illumination.

Embodiment 1

FIG. 1 is a schematic diagram of a display panel according to an embodiment of the present disclosure. Embodiment 1 of the present disclosure provides a display panel 100 and a display device. The display panel 100 comprises a first substrate 10, a second substrate 20, and a liquid crystal layer 30 disposed between the first substrate 10 and the second substrate 20. The first substrate 10 comprises a driving circuit layer 12. The driving circuit layer 12 comprises a light-shielding portion 121 and a plurality of light-transmitting portions 122. The second substrate 20 comprises a light-shielding layer 23. The light-shielding layer 23 comprises a body portion 231 and a plurality of hollow portions 232. The body portion 231 is disposed corresponding to the light-shielding portion 121, and the hollow portions 232 are disposed corresponding to the light-transmitting portion 122. The second substrate 20 further comprises a refractive layer 01. The refractive layer 01 is disposed on a side of the body portion 231 away from the liquid crystal layer 30.

Since the refractive layer 01 of the second substrate 20 is disposed on the side of the body portion 231 away from the liquid crystal layer 30, when a light emitted by a light source disposed on a side of the second substrate 20 away from the liquid crystal layer 30 irradiates to the display panel 100, the light will be refracted by the refractive layer 01 before reaching the body portion 231. The refractive layer 01 can change an emission direction of an incident light, so that light that should originally irradiate to the body portion 231 and be absorbed by the body portion 231 can smoothly enter the display panel 100 through the hollow portions 232, thereby increasing a total amount of light entering the display panel 100, and thus increasing power efficiency of the display panel 100, and under limited ambient illumination, increasing a maximum brightness of the display panel 100.

In some embodiments of the present disclosure, a vertical projection of the refractive layer 01 on the light-shielding layer 23 covers the light-shielding portion 121 and does not overlap the hollow portions 232. A layout region of the refractive layer 01 is exactly same as a region of the light-shielding portion 121.

In some embodiments of the present disclosure, the refractive layer 01 comprises a plurality of optical lenses with metasurfaces.

Specifically, the optical lenses with the metasurfaces are optical devices that flexibly and effectively regulate light through artificial sub-wavelength units. They are diffractive optical lenses that are achromatic and distortion-free in a visible light band, their function is comparable to that of conventional optical lenses, and they have advantages of increasing numerical aperture and deflecting light at a large angle. In the present disclosure, by setting the optical lenses in the refractive layer 01 to the optical lenses with the metasurface, an angle at which the refractive layer 01 deflects the light emitted by the light source is increased, thereby enabling more light to enter the display panel 100, and thus improving the power efficiency and the maximum brightness of the display panel 100.

In some embodiments of the present disclosure, the optical lenses are titanium oxide nanopillars, and at least two of the titanium oxide nanopillars have different heights.

In the display panel 100, by setting a material of the optical lenses to titanium oxide, and setting a shape of the optical lenses to a nanoscale columnar structure, optical performance and physical performance of the optical lenses are effectively improved, which is conducive to improving a refractive effect of the refractive layer 01 and improving a display quality and usage stability of the display panel 100.

Since at least two of the titanium oxide nanopillars have different heights, heights of the titanium oxide nanopillars in different areas of the refractive layer 01 can be differentiated to meet refraction angle requirements of different areas, thereby further increasing the total amount of the light entering the display panel 100, and further improving the power efficiency of the display panel 100 and the maximum brightness of the display panel 100.

Optionally, the heights of the titanium oxide nanopillars are 800 to 1200 nm, such as 800 nm, 850 nm, 900 nm, 950 nm, 1000 nm, 1050 nm, 1100 nm, 1150 nm, and 1200 nm.

In some embodiments of the present disclosure, the display panel 100 is a reflective display panel. The side of the second substrate 20 away from the liquid crystal layer 30 is the display side DD of the display panel 100. The second substrate 20 further comprises the refractive layer 01. The refractive layer 01 is disposed on a side of the light-shielding layer 23 away from the liquid crystal layer 30. The first substrate 10 further comprises a reflective layer 02. The reflective layer 02 is disposed on a side of the driving circuit layer 12 facing the liquid crystal layer 30. A vertical projection of the reflective layer 02 on the driving circuit layer 12 covers at least the light-transmitting portion 122. The reflective layer 02 comprises a first surface 021 and a second surface 022. The second surface 022 is located on a side of the first surface 021 facing the liquid crystal layer 30, and the second surface 022 is a reflective surface of the reflective layer 02.

Since the display panel 100 is the reflective display panel 100, a light source of the display panel 100 is an external ambient light incident from the display side DD of the display panel 100. The external ambient light will be refracted by the refractive layer 01 before irradiating the body portion 231. Since the refractive layer 01 can change an emission direction of an incident light, so that the light that should originally irradiate to the body portion 231 and be absorbed by the body portion 231 can smoothly enter the display panel 100 through the hollow portions 232, thereby increasing the total amount of the light entering the display panel 100, and thus increasing the power efficiency of the display panel 100, and under the limited ambient illumination, increasing the maximum brightness of the display panel 100. Furthermore, since the vertical projection of the reflective layer 02 on the driving circuit layer 12 covers at least the light-transmitting portion 122, and the second surface 022 is the reflective surface of the reflective layer 02, the external ambient light incident into the display panel 100 will be reflected by the second surface 022, pass through the liquid crystal layer 30 and the second substrate 20 in sequence, and then be emitted from the display panel 100 to achieve reflective display.

In some embodiments of the present disclosure, the first substrate 10 further comprises a color filter layer 13 and a pixel electrode layer 14. The color filter layer 13 is disposed on a side of the reflective layer 02 facing the liquid crystal layer 30. The pixel electrode layer 14 comprises a plurality of pixel electrodes. The pixel electrodes are disposed corresponding to the light-transmitting portions 122. The pixel electrodes are disposed on a side of the color filter layer 13 facing the liquid crystal layer 30.

Since the color filter layer 13 is disposed on the side of the reflective layer 02 facing the liquid crystal layer 30, and the pixel electrodes are disposed on the side of the color filter layer 13 facing the liquid crystal layer 30, the color filter layer 13 is disposed between the driving circuit layer 12 and the pixel electrode layer 14. The color filter layer 13 increases a separation distance between the driving circuit layer 12 and the pixel electrode layer 14, thereby reducing a coupling capacitance between metal wires and circuit elements of the driving circuit layer 12 and the pixel electrodes of the pixel electrode layer 14, and thus reducing crosstalk, and improving the display quality of the display panel 100.

In some embodiments of the present disclosure, the first substrate 10 further comprises an anti-oxidation protective layer 15. The anti-oxidation protective layer 15 comprises a plurality of anti-oxidation protective units. The anti-oxidation protective units are disposed corresponding to the pixel electrodes. The anti-oxidation protective layer 15 is disposed on a side of the pixel electrode layer 14 facing the second substrate 20.

In the display panel 100, the anti-oxidation protective units can protect the pixel electrodes, thereby improving stability of the pixel electrodes.

In some embodiments of the present disclosure, the second substrate 20 further comprises a second substrate layer 21, a planarization layer 22, a base layer 03, and a common electrode layer 24. The planarization layer 22 is disposed on a side of the second substrate layer 21 facing the liquid crystal layer 30. The base layer 03 is disposed on a side of the planarization layer 22 facing the liquid crystal layer 30. A material of the base layer 03 is a silicon-based material. The refractive layer 01 is disposed on a surface of the base layer 03 facing the liquid crystal layer 30. The light-shielding layer 23 is disposed on a side of the refractive layer 01 facing the first substrate 10. The common electrode layer 24 is disposed on a side of the light-shielding layer 23 facing the liquid crystal layer 30.

Since the refractive layer 01 comprises the optical lenses with the metasurfaces, in the present disclosure, the material of the base layer 03 is selected as a silicon-based material, thereby providing an optimal growth environment for the optical lenses, and thus ensuring a refractive effect of the optical lenses. The planarization layer 22 can provide a flat environment for arrangement of the base layer 03. Since a vertical projection of the common electrode layer 24 on the second substrate layer 21 overrides a vertical projection of the light-shielding layer 23 on the second substrate layer 21, the common electrode layer 24 can protect the light-shielding layer 23.

Optionally, a thickness of the base layer 03 is 2-4 μm, such as 2 μm, 3 μm, and 4 μm.

The display panel 100 is a reflective display panel. The display panel 100 further comprises a second polarizer 50 disposed on the side of the second substrate 20 away from the liquid crystal layer 30, and the second polarizer 50 is a circular polarizer.

In some embodiments of the present disclosure, the light-shielding portion 121 comprises at least one of a data line, a scan line, and a thin-film transistors. The light-transmitting portions 122 are formed from at least one transparent layer in the driving circuit layer 12. The light-shielding layer 23 is a black matrix (BM).

Furthermore, Embodiment 1 of the present disclosure further provides a display device. The display device comprises a housing and the display panel 100. The housing has an accommodating space, and the display panel 100 is disposed in the accommodating space.

Embodiment 2

Figure 2:
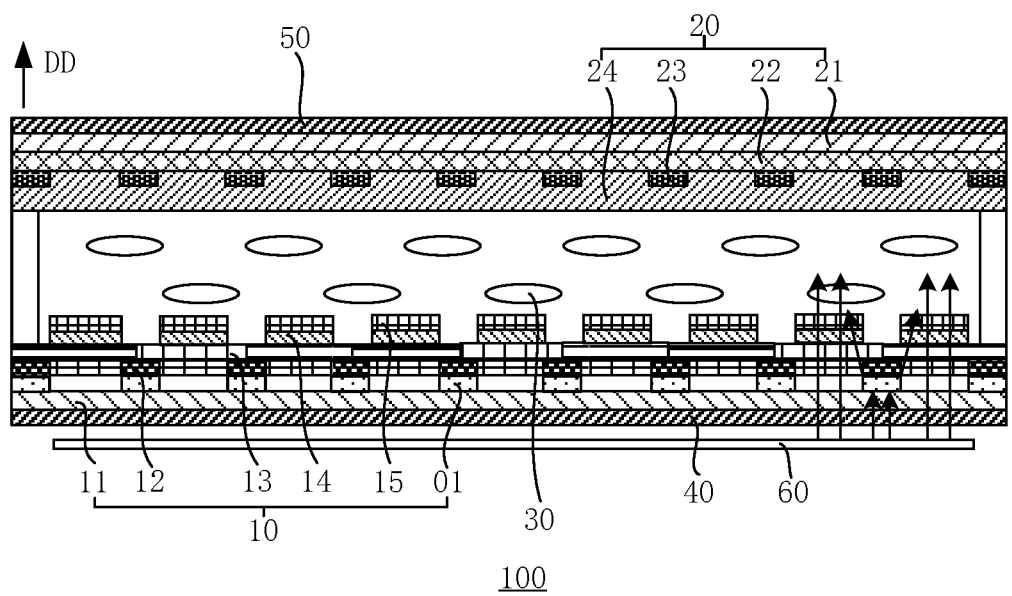
FIG. 2 is a schematic diagram of a display panel according to another embodiment of the present disclosure.

FIG. 2 is a schematic diagram of a display panel according to another embodiment 2 of the present disclosure. The display panel 100 comprises a first substrate 10, a second substrate 20, and a liquid crystal layer 30. The liquid crystal layer 30 is disposed between the first substrate 10 and the second substrate 20. The first substrate 10 comprises a driving circuit layer 12. The driving circuit layer 12 comprises a light-shielding portion 121 and a plurality of light-transmitting portions 122. The second substrate 20 comprises a light-shielding layer 23. The light-shielding layer 23 comprises a body portion 231 and a plurality of hollow portions 232. The body portion 231 is disposed corresponding to the light-shielding portion 121, and the hollow portions 232 are disposed corresponding to the light-transmitting portions 122.

The structure of the display panel 100 provided in Embodiment 2 of the present disclosure is similar to the structure of the display panel 100 provided in Embodiment 1 of the present disclosure, and same parts will not be described again in Embodiment 2 of the present disclosure.

The first substrate 10 further comprises a refractive layer 01. The refractive layer 01 is disposed on a side of the light-shielding portion 121 away from the liquid crystal layer 30.

Since the refractive layer 01 of the first substrate 10 is disposed on the side of the light-shielding portion 121 away from the liquid crystal layer 30, when a light emitted by a light source disposed on a side of the first substrate 10 away from the liquid crystal layer 30 irradiates to the display panel 100, the light will be refracted by the refractive layer 01 before reaching the light-shielding portion 121. The refractive layer 01 can change an emission direction of an incident light, so that light that should originally irradiate to the light-shielding portion 121 and be reflected by the light-shielding portion 121 can smoothly enter the display panel 100 through the light-transmitting portions 122, thereby increasing a total amount of light entering the display panel 100, and thus increasing power efficiency of the display panel 100, and under limited ambient illumination, increasing a maximum brightness of the display panel 100.

A vertical projection of the refractive layer 01 on the driving circuit layer 12 covers the light-shielding portion 121 and does not overlap the transmission portions 122.

The display panel 100 is a transmissive display panel. A side of the second substrate 20 away from the liquid crystal layer 30 is a display side DD of the display panel 100. The display panel 100 further comprises a backlight 60. The backlight 60 is disposed on the side of the first substrate 10 away from the liquid crystal layer 30. The first substrate 10 further comprises the refractive layer 01. The refractive layer 01 is disposed on a side of the driving circuit layer 12 away from the liquid crystal layer 30.

In the display panel 100, a light emitted by the backlight 60 disposed on the side of the first substrate 10 away from the liquid crystal layer 30 will first be refracted by the refractive layer 01. The refractive layer 01 can change an emission direction of an incident light, so that the light that should originally irradiate to the light-shielding portion 121 and be reflected by the light-shielding portion 121 can smoothly enter the display panel 100 through the light-transmitting portions 122, thereby increasing the total amount of the light entering the display panel 100, and thus increasing the power efficiency of the display panel 100, and under the limited ambient illumination, increasing the maximum brightness of the display panel 100.

The first substrate 10 further comprises a first substrate layer 11. A material of the first substrate layer 11 is a silicon-based material. The refractive layer 01 is disposed on a surface of the first substrate layer 11 facing the liquid crystal layer 30. Optionally, a thickness of the first substrate layer 11 is 2-4 μm.

In the display panel 100, since the refractive layer 01 comprises a plurality of optical lenses with metasurfaces, the material of the first substrate layer 11 is selected as a silicon-based material, thereby providing an optimal growth environment for the optical lenses, and thus ensuring a refractive effect of the optical lenses.

Furthermore, after the refractive layer 01 is formed, the first substrate layer 11 may continue to be used as a carrier substrate, and the driving circuit layer 12 is formed on a side of the refractive layer 01 away from the first substrate layer 11. Compared with the structure of Embodiment 1 which requires the additional base layer 03, this reduces a number of layers of the display panel 100. Of course, in other embodiments of the present disclosure, the driving circuit layer 12 may be formed separately on a transparent substrate, and the refractive layer 01 may be disposed on a side of the transparent substrate away from the driving circuit layer 12 by adhesion.

Optionally, in order to ensure a film-forming quality of the driving circuit layer 12 formed on a side of the refractive layer 01 facing the liquid crystal layer 30, a transparent material, such as an optical glue or an organic flat material, is filled between the first substrate layer 11 and the light-transmitting portions 122.

The display panel 100 further comprises a first polarizer 40 and a second polarizer 50. The first polarizer 40 is disposed on the side of the first substrate 10 away from the liquid crystal layer 30. The second polarizer 50 is disposed on the side of the second substrate 20 away from the liquid crystal layer 30. The first polarizer 40 and the second polarizer 50 are linear polarizers.

Furthermore, this embodiment further provides a display device. The display device comprises a housing and the display panel 100. The housing has an accommodating space, and the display panel 100 is disposed in the accommodating space.

In summary, the present disclosure provides a display panel and a display device. The display panel comprises a first substrate, a second substrate, and a liquid crystal layer disposed between the first substrate and the second substrate. The first substrate comprises a driving circuit layer. The driving circuit layer comprises a light-shielding portion and a plurality of light-transmitting portions. The second substrate comprises a light-shielding layer. The light-shielding layer comprises a body portion and a plurality of hollow portions. The body portion is disposed corresponding to the light-shielding portion. The hollow portions are disposed corresponding to the light-transmitting portions. The first substrate further comprises a refractive layer disposed on a side of the light-shielding portion away from the liquid crystal layer, or the second substrate further comprises a refractive layer disposed on a side of the body portion away from the liquid crystal layer. A refractive layer of the display panel can change an emission direction of a light, so that a light emitted by a light source that should originally irradiate to a light-shielding portion or a body portion enters the display panel after being refracted by the refractive layer, thereby increasing a maximum brightness of the display panel under limited ambient illumination.

The display panel and the display device provided by the embodiments of the present disclosure are described in detail above. The present disclosure uses specific examples to describe principles and embodiments of the present disclosure. The above description of the embodiments is only for helping to understand solutions of the present disclosure and their core ideas. Furthermore, those skilled in the art may make modifications to the specific embodiments and applications according to ideas of the present invention. In conclusion, the present specification should not be construed as a limitation to the present invention.

What is claimed is:

1. A display panel, comprising:
   a first substrate comprising a driving circuit layer, wherein the driving circuit layer comprises a light-shielding portion and a plurality of light-transmitting portions;

a second substrate comprising a light-shielding layer, wherein the light-shielding layer comprises a body portion and a plurality of hollow portions, the body portion is disposed corresponding to the light-shielding portion, and the hollow portions are disposed corresponding to the light-transmitting portions;

a liquid crystal layer disposed between the first substrate and the second substrate; and a refractive layer disposed on a side of the light-shielding portion away from the liquid crystal layer or a side of the body portion away from the liquid crystal layer;

wherein the refractive layer comprises a plurality of optical lenses with metasurfaces.

2. The display panel according to claim 1, wherein the optical lenses are titanium oxide nanopillars, and at least two of the titanium oxide nanopillars have different heights.

3. The display panel according to claim 1, wherein the display panel is a reflective display panel, a side of the second substrate away from the liquid crystal layer is a display side of the display panel, the second substrate further comprises the refractive layer, and the refractive layer is disposed on a side of the light-shielding layer away from the liquid crystal layer; and wherein the first substrate further comprises a reflective layer, the reflective layer is disposed on a side of the driving circuit layer facing the liquid crystal layer, a vertical projection of the reflective layer on the driving circuit layer covers at least the light-transmitting portions, the reflective layer comprises a first surface and a second surface, the second surface is located on a side of the first surface facing the liquid crystal layer, and the second surface is a reflective surface of the reflective layer.

4. The display panel according to claim 3, wherein the first substrate further comprises:

a color filter layer disposed on a side of the reflective layer facing the liquid crystal layer;

a pixel electrode layer comprising a plurality of pixel electrodes, wherein the pixel electrodes are disposed corresponding to the light-transmitting portions, and the pixel electrodes are disposed on a side of the color filter layer facing the liquid crystal layer.

5. The display panel according to claim 4, wherein the first substrate further comprises:

an anti-oxidation protective layer disposed on a side of the pixel electrode layer facing the second substrate and comprising a plurality of anti-oxidation protective units, wherein the anti-oxidation protective units are disposed corresponding to the pixel electrodes.

6. The display panel according to claim 3, wherein the second substrate further comprises:

a second substrate layer;

a planarization layer disposed on a side of the second substrate layer facing the liquid crystal layer;

a base layer disposed on a side of the planarization layer facing the liquid crystal layer, wherein a material of the base layer is a silicon-based material, the refractive layer is disposed on a surface of the base layer facing the liquid crystal layer, and the light-shielding layer is disposed on a side of the refractive layer facing the first substrate; and a common electrode layer disposed on a side of the light-shielding layer facing the liquid crystal layer, wherein a vertical projection of the common electrode layer on the second substrate covers a vertical projection of the light-shielding layer on the second substrate.

7. The display panel according to claim 3, wherein the first substrate further comprises a first substrate layer, a material of the first substrate layer is a silicon-based material, and the refractive layer is disposed on a surface of the first substrate layer facing the liquid crystal layer.

8. The display panel according to claim 1, wherein the display panel is a transmissive display panel, a side of the second substrate away from the liquid crystal layer is a display side of the display panel, the display panel further comprises a backlight, the backlight is disposed on a side of the first substrate away from the liquid crystal layer, the first substrate further comprises the refractive layer, the refractive layer is disposed on a side of the driving circuit layer away from the liquid crystal layer.

9. A display device, comprising:

a housing, having an accommodating space; and a display panel, disposed in the accommodating space, the display panel comprising:

a first substrate comprising a driving circuit layer, wherein the driving circuit layer comprises a light-shielding portion and a plurality of light-transmitting portions;

a second substrate comprising a light-shielding layer, wherein the light-shielding layer comprises a body portion and a plurality of hollow portions, the body portion is disposed corresponding to the light-shielding portion, and the hollow portions are disposed corresponding to the light-transmitting portions;

a liquid crystal layer disposed between the first substrate and the second substrate; and a refractive layer disposed on a side of the light-shielding portion away from the liquid crystal layer or a side of the body portion away from the liquid crystal layer;

wherein the refractive layer comprises a plurality of optical lenses with metasurfaces.

10. The display device according to claim 9, wherein the optical lenses are titanium oxide nanopillars, and at least two of the titanium oxide nanopillars have different heights.

11. The display device according to claim 9, wherein the display panel is a reflective display panel, a side of the second substrate away from the liquid crystal layer is a display side of the display panel, the second substrate further comprises the refractive layer, and the refractive layer is disposed on a side of the light-shielding layer away from the liquid crystal layer; and wherein the first substrate further comprises a reflective layer, the reflective layer is disposed on a side of the driving circuit layer facing the liquid crystal layer, a vertical projection of the reflective layer on the driving circuit layer covers at least the light-transmitting portions, the reflective layer comprises a first surface and a second surface, the second surface is located on a side of the first surface facing the liquid crystal layer, and the second surface is a reflective surface of the reflective layer.

12. The display device according to claim 11, wherein the first substrate further comprises:

a color filter layer disposed on a side of the reflective layer facing the liquid crystal layer;

a pixel electrode layer comprising a plurality of pixel electrodes, wherein the pixel electrodes are disposed corresponding to the light-transmitting portions, and the pixel electrodes are disposed on a side of the color filter layer facing the liquid crystal layer.

13. The display device according to claim 12, wherein the first substrate further comprises:

an anti-oxidation protective layer disposed on a side of the pixel electrode layer facing the second substrate and comprising a plurality of anti-oxidation protective units, wherein the anti-oxidation protective units are disposed corresponding to the pixel electrodes.

14. The display device according to claim 11, wherein the second substrate further comprises:
   a second substrate layer;
   a planarization layer disposed on a side of the second substrate layer facing the liquid crystal layer;
   a base layer disposed on a side of the planarization layer facing the liquid crystal layer, wherein a material of the base layer is a silicon-based material, the refractive layer is disposed on a surface of the base layer facing the liquid crystal layer, and the light-shielding layer is disposed on a side of the refractive layer facing the first substrate; and
   a common electrode layer disposed on a side of the light-shielding layer facing the liquid crystal layer, wherein a vertical projection of the common electrode layer on the second substrate covers a vertical projection of the light-shielding layer on the second substrate.

15. The display device according to claim 11, wherein the first substrate further comprises a first substrate layer, a material of the first substrate layer is a silicon-based material, and the refractive layer is disposed on a surface of the first substrate layer facing the liquid crystal layer.

16. The display device according to claim 9, wherein the display panel is a transmissive display panel, a side of the second substrate away from the liquid crystal layer is a display side of the display panel, the display panel further comprises a backlight, the backlight is disposed on a side of the first substrate away from the liquid crystal layer, the first substrate further comprises the refractive layer, the refractive layer is disposed on a side of the driving circuit layer away from the liquid crystal layer.

17. A display panel, comprising:
   a first substrate comprising a driving circuit layer, wherein the driving circuit layer comprises a light-shielding portion and a plurality of light-transmitting portions;
   a second substrate comprising a light-shielding layer, wherein the light-shielding layer comprises a body portion and a plurality of hollow portions, the body portion is disposed corresponding to the light-shielding portion, and the hollow portions are disposed corresponding to the light-transmitting portions;
   a liquid crystal layer disposed between the first substrate and the second substrate; and
   a refractive layer disposed on a side of the light-shielding portion away from the liquid crystal layer or a side of the body portion away from the liquid crystal layer;
   wherein the second substrate further comprises:
   a second substrate layer;
   a planarization layer disposed on a side of the second substrate layer facing the liquid crystal layer;
   a base layer disposed on a side of the planarization layer facing the liquid crystal layer, wherein a material of the base layer is a silicon-based material, the refractive layer is disposed on a surface of the base layer facing the liquid crystal layer, and the light-shielding layer is disposed on a side of the refractive layer facing the first substrate; and
   a common electrode layer disposed on a side of the light-shielding layer facing the liquid crystal layer, wherein a vertical projection of the common electrode layer on the second substrate covers a vertical projection of the light-shielding layer on the second substrate.

18. The display panel according to claim 17, wherein the display panel is a reflective display panel, a side of the second substrate away from the liquid crystal layer is a display side of the display panel; and
   wherein the first substrate further comprises a reflective layer, the reflective layer is disposed on a side of the driving circuit layer facing the liquid crystal layer, a vertical projection of the reflective layer on the driving circuit layer covers at least the light-transmitting portions, the reflective layer comprises a first surface and a second surface, the second surface is located on a side of the first surface facing the liquid crystal layer, and the second surface is a reflective surface of the reflective layer.

19. The display panel according to claim 18, wherein the first substrate further comprises:
   a color filter layer disposed on a side of the reflective layer facing the liquid crystal layer;
   a pixel electrode layer comprising a plurality of pixel electrodes, wherein the pixel electrodes are disposed corresponding to the light-transmitting portions, and the pixel electrodes are disposed on a side of the color filter layer facing the liquid crystal layer.

20. The display panel according to claim 19, wherein the first substrate further comprises:
   an anti-oxidation protective layer disposed on a side of the pixel electrode layer facing the second substrate and comprising a plurality of anti-oxidation protective units, wherein the anti-oxidation protective units are disposed corresponding to the pixel electrodes.

* * * * *